US007110436B2

(12) United States Patent
Yanagi

(10) Patent No.: US 7,110,436 B2
(45) Date of Patent: Sep. 19, 2006

(54) CDMA RECEIVING APPARATUS WITH TRANSMISSION POWER CONTROL USING PREVIOUS SIR VALUE

(75) Inventor: Shuzo Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 1101 days.

(21) Appl. No.: 09/953,151

(22) Filed: Sep. 17, 2001

(65) Prior Publication Data

US 2002/0034216 A1 Mar. 21, 2002

(30) Foreign Application Priority Data

Sep. 18, 2000 (JP) .............................. 2000-282060

(51) Int. Cl.
*H04B 1/69* (2006.01)
*H04B 1/707* (2006.01)

(52) U.S. Cl. ....................................... 375/147; 375/141
(58) Field of Classification Search ................ 375/130, 375/150, 142–144, 147, 340, 343, 349; 370/318, 370/323, 342, 347; 455/226.2–226.3, 436, 455/442, 522

See application file for complete search history.

(56) References Cited

U.S. PATENT DOCUMENTS

| | | | | |
|---|---|---|---|---|
| 5,566,165 A | * | 10/1996 | Sawahashi et al. | 370/342 |
| 5,751,763 A | * | 5/1998 | Bruckert | 375/141 |
| 5,839,056 A | * | 11/1998 | Hakkinen | 455/69 |
| 6,101,179 A | * | 8/2000 | Soliman | 370/342 |
| 6,188,678 B1 | * | 2/2001 | Prescott | 370/318 |
| 6,442,155 B1 | * | 8/2002 | Suk et al. | 370/342 |
| 6,473,451 B1 | * | 10/2002 | Seki et al. | 375/142 |
| 6,493,541 B1 | * | 12/2002 | Gunnarsson et al. | 455/69 |
| 6,600,772 B1 | * | 7/2003 | Zeira et al. | 375/130 |
| 6,658,045 B1 | * | 12/2003 | Jin | 375/147 |
| 2001/0019961 A1 | * | 9/2001 | Nakahara et al. | 455/522 |

FOREIGN PATENT DOCUMENTS

| | | |
|---|---|---|
| EP | 1 133 070 A2 | 9/2001 |
| EP | 1 176 739 A1 | 1/2002 |
| JP | 9-284205 | 10/1997 |
| JP | 09-312609 | 12/1997 |
| JP | 10-13364 | 1/1998 |
| JP | 10-51424 | 2/1998 |

(Continued)

OTHER PUBLICATIONS

Japanese Office Action dated Dec. 26, 2002, with partial English translation.
United Kingdom Search Report dated Apr. 26, 2002.

*Primary Examiner*—Emmanuel Bayard
*Assistant Examiner*—Lawrence B Williams
(74) *Attorney, Agent, or Firm*—McGinn IP Law Group PLLC

(57) ABSTRACT

A CDMA receiving apparatus includes a receiving section, a memory circuit, an estimating circuit and a generating circuit. The receiving section generates a baseband signal from a received radio signal, searches a path having the highest correlation with the received radio signal, generates a path delay quantity for the searched path and generates a demodulated signal as an object signal from the baseband signal based on the path delay quantity. The memory circuit stores at least one SIR value as a previous SIR value. The estimating circuit estimates the SIR value from the object signal and stores the estimated SIR value in the memory circuit. The generating circuit generates a TPC (transmission power control) bit signal for controlling transmission power from the estimated SIR value and the previous SIR value stored in the memory circuit based on the path delay quantity and a reference SIR value.

15 Claims, 5 Drawing Sheets

FOREIGN PATENT DOCUMENTS

| | | |
|---|---|---|
| JP | 10-145293 | 5/1998 |
| JP | 2785804 | 5/1998 |
| JP | 11-4213 | 1/1999 |
| JP | 11-505693 | 5/1999 |
| JP | 11-284569 | 10/1999 |
| JP | 11-331071 | 11/1999 |
| JP | 2000-165321 | 6/2000 |
| JP | 2000-236296 | 8/2000 |

* cited by examiner

CDMA RECEIVING APPARATUS WITH TRANSMISSION POWER CONTROL USING PREVIOUS SIR VALUE

BACKGROUND OF THE INVENTION

1. Field of the Invention

The present invention is a COMA (code division multiple access) receiving apparatus, and more particularly, to a COMA receiving apparatus which carries out a transmission power control.

2. Description of the Related Art

In a CDMA communication system, a transmission power control is carried out to keep reception quality on the receiving end. In the transmission power control used for the COMA communication system, a transmission power control bit (TPC bit) is generally used.

FIG. 1 shows a section for generating the TPC bit in a conventional CDMA receiving apparatus. The CDMA receiving apparatus is composed of a receiving antenna 101, a quasi-synchronization detecting circuit 102, an A/D (analog-to-digital) converter 103. a synchronization tracking circuit 104, a despreading circuit 105, a demodulating circuit 106, an SIR (signal-to-interference plus noise power ratio) estimating circuit 107, a TPC bit generating circuit 108. The receiving antenna 101 outputs a reception signal to the quasi-synchronization detecting circuit 102. The quasi-synchronization detecting circuit 102 converts a reception signal into a signal having a frequency band for a baseband process, i.e., a baseband signal, and outputs to the A/D converter 103. The A/D converter 103 A/D-converts the reception signal and outputs to the synchronization tracking circuit 104 and the despreading circuit 105.

The synchronization tracking circuit 104 carries out path searches using a spreading code for a specific user and outputs a path delay quantity of the path with the highest correlation with the spreading code among the searched paths to the despreading circuit 105. The despreading circuit 105 despreads the baseband signal based on the path delay quantity and outputs to the demodulating circuit 106. The demodulating circuit 106 carries out a bit phase adjustment to the reception signal and outputs to the SIR estimating circuit 107. The SIR estimating circuit 107 estimates an SIR value based on the demodulated reception signal and outputs the SIR value to the TPC bit generating circuit 108.

The TPC bit generating circuit 108 compares the SIR value and a reference SIR value supplied from a host apparatus (not illustrated) and generates a TPC bit signal based on the comparison result. That is, the TPC bit generating circuit 108 generates the TPC bit signal to increase transmission power, if (reference SIR value)>(estimated SIR value), and generates the TPC bit to decrease the transmission power, if (reference SIR value)<(estimated SIR value).

Such a CDMA receiving apparatus may be provided in a base station and a mobile station. In the transmission power control using the CDMA receiving apparatus, when the base station and the mobile station in a cell of the base station communicate with each other, the mobile station measures the SIR value of the signal transmitted from the base station, and determines the TPC bit signal for controlling the transmission power of the base station based on the measurement result. Then, the TPC bit signal is inserted in a transmission signal and transmitted to the base station. The base station receives the transmission signal from the mobile station, extracts the TPC bit signal from the transmission signal and updates the transmission power in accordance with the TPC bit signal.

The base station measures the SIR value of the transmission signal from the mobile station, and determines the TPC bit signal for controlling the transmission power of the mobile station based on the measurement result. Then, a TPC bit signal is inserted in a transmission signal and transmitted to the mobile station. The mobile station receives the transmission signal from the base station, extracts the TPC bit signal from the transmission signal and updates the transmission power in accordance with the TPC bit signal.

A pilot bit pattern of a known bit pattern is arranged in a transmission signal for every slot (periodically) and the TPC bit signal is arranged for every slot. Therefore, the pilot bit pattern is used as a reference phase signal to carry out quasi-synchronization detection to the transmission signal and to measure an SIR value.

The CDMA receiving apparatus extracts a pilot bit pattern from the reception slot received from the counter station, measures an SIR value from the pilot bit pattern, and generates a TPC bit signal based on the SIR value. Then, the TPC bit signal is inserted in the transmission slot and transmitted to the counter station. The reception slot used to measure the SIR value and the transmission slot used to insert the TPC bit signal generated based on the SIR value have a one-to-one correspondence relation.

In such a CDMA receiving apparatus, when the path delay quantity is large, the timing of reception of the pilot bit pattern is delayed. As a result, the timings of the generations of the SIR value and the TPC bit signal are delayed. Therefore, it sometimes becomes not possible to correctly insert the TPC bit signal in the transmission slot.

In conjunction with the above description, a transmission power control apparatus is disclosed in Japanese Laid Open Patent application (JP-A-Heisei 9-284205). In this reference, a reception SIR measuring apparatus uses a signal in which a known pilot signal is inserted in a data signal with a predetermined interval. A detecting section carries out interpolation synchronization detection using the pilot signal. A power value of data symbol determined through the interpolation is calculated. A summation of the power values of the data symbol is calculated over predetermined pilot signal intervals. A difference in the power value from a fading envelope at the same sampling time as the data symbol determined is calculated. The power value differences are summed over predetermined pilot signal intervals. Then, a ratio between the summation of power values of the data symbol and the summation of the power value differences is calculated, and the ratio is used as an SIR.

Also, a method of controlling transmission power in a CDMA mobile communication system Is disclosed in Japanese Laid Open Patent application (JP-A-Heisei 10-145293). In this reference, a first communication apparatus detects a signal level of a communication signal from a second communication apparatus at a predetermined timing. A transmission power control signal is generated based on the detected signal level and arranged in a transmission signal from the first communication apparatus to the second communication apparatus at a predetermined position.

Also, a method of measuring a reception SIR is disclosed in Japanese Laid Open Patent application (JP-A-Heisei 10-13364). In the reference, a synchronization detecting apparatus on a receiving side carries out synchronization detection to a signal in which a known pilot signal is inserted in an information signal in a predetermined in the transmission side. The synchronization detecting apparatus calculates a power value of a fading envelope obtained by interpolation on a complex signal space of a baseband. The power value is averaged in the predetermined pilot signal interval, and the average value is handled as a reception desired wave power. A ratio of the received data symbol and the fading envelope obtained by the interpolation is calculated on the complex signal space, and the ratio is multiplied by the square of the fading envelope. A signal point is determined based on the multiplying result and the fading envelope containing an interference ingredient is calculated using the received data symbol and the determining value. A difference between the calculated value and the interpolated fading envelope is calculated. The square of the differences is integrated over the pilot signal interval. The integrated values are averaged over a plurality of pilot intervals. The average value is handled as a reception interference wave power. Then, a ratio between the reception desired wave power and the reception interference wave power is set as a SIR value.

Also, a radio communication apparatus is disclosed in Japanese Laid Open Patent application (JP-A-Heisei 11-331071). In this reference, a data arrangement determining section determines the arrangement of pilot data and transmission power control data containing the transmission power control information which is based on the measurement result of a reception quality in the slot based on a processing delay and a propagation delay which are needed to control transmission power. A slot offset setting section sets an offset for the slot position relation between an upward channel and a downward channel.

Also, a mobile communications system is disclosed in Japanese Patent No. 2,785,804. In this reference, a carrier signal is expressed by an in-phase component and an orthogonal component and a carrier signal detecting section detects a carrier signal point for every constant period. An amplitude correcting section corrects the amplitude of the carrier signal point based on previous transmission power control values. An estimating section estimates the carrier signal point where the transmission power control is next carried out, using the carrier signal point with the amplitude corrected. A comparing section compares power at the estimated carrier signal point with a predetermined reference value. A transmission power control unit generates a transmission power control value when the transmission power control is next carried out based on the comparison result. A memory stores and supplies the transmission power control value to the amplitude correcting section as the previous transmission power control value. A transmitting section transmits the transmission power control value. A base station includes the above sections and a transmission power control circuit. Each of a plurality of mobile stations is connected with the base station using an identical frequency electric wave, and is controlled based on the transmission power control value transmitted from the base station such that the reception signal powers from the plurality of mobile stations in the base station are equal to each other.

SUMMARY OF THE INVENTION

An object of the present invention is to provide a CDMA receiving apparatus in which a TPC bit signal can be inserted in a transmission signal reliably.

Another object of the present invention is to provide a CDMA receiving apparatus in which a TPC bit signal can be inserted in a transmission signal reliably and transmission power control can be carried out in a high precise.

In an aspect of the present invention, a CDMA (code division multiple access) receiving apparatus includes a receiving section, a memory circuit, an estimating circuit and a generating circuit. The receiving section generates a baseband signal from a received radio signal, searches a path having the highest correlation with the received radio signal, generates a path delay quantity for the searched path and generates a demodulated signal as an object signal from the baseband signal based on the path delay quantity. The memory circuit stores at least one SIR value as a previous SIR value. The estimating circuit estimates the SIR value from the object signal and stores the estimated SIR value in the memory circuit. The generating circuit generates a TPC (transmission power control) bit signal for controlling transmission power from the estimated SIR value and the previous SIR value stored in the memory circuit based on the path delay quantity and a reference SIR value.

Here, the generating circuit generates the TPC bit signal using the estimated SIR value and the previous SIR value stored in the memory circuit when the path delay quantity is equal to or smaller than a first threshold value held in the generating circuit and using the previous SIR value stored in the memory circuit when the path delay quantity is larger than the first threshold value. In this case, the generating circuit may generate the TPC bit signal using an average of the estimated SIR value and the previous SIR value stored in the memory circuit when the path delay quantity is equal to or smaller than a first threshold value held in the generating circuit and using an average of the previous SIR value stored in the memory circuit when the path delay quantity is larger than the first threshold value.

Also, it is desired that a newer one of the estimated SIR value and the previous SIR value stored in the memory circuit is weighted with a larger, weight.

Also, the generating circuit calculates a calculation SIR value from at least one of the estimated SIR value and the previous SIR value stored in the memory circuit, and generates the TPC bit signal such that the transmission power is increased, when the calculation SIR value is equal to or smaller than the reference SIR value, and generates the TPC bit signal such that the transmission power is decreased, when the calculation SIR value is larger than the reference SIR value.

Also, the generating circuit may include a calculation control circuit, a calculating circuit and a determining circuit. The calculation control circuit generates a calculation control signal based on the path delay quantity and a first threshold value held therein. The calculating circuit calculates a calculation SIR value from the estimated SIR value and the previous SIR value stored in the memory circuit based on the control signal. The determining circuit generates the TPC bit signal based on the calculation SIR value and the reference SIR value.

Also, the receiving section may include a detecting section, a synchronization tracking circuit and a demodulating section. The detecting section generates a baseband signal from the received radio signal. The synchronization tracking circuit searches the path having the highest correlation with the received radio signal, and generates the path delay quantity for the searched path. The demodulating section carries out a despreading operation to the baseband signal based on the path delay quantity to produce a despread signal and generates the demodulated signal as the object signal from the despread signal.

In another aspect of the present invention, a CDMA (code division multiple access) receiving apparatus includes a receiving section, a memory circuit, an estimating circuit and a generating circuit. The receiving section generates a baseband signal from a received radio signal, and searches N (N is an integer more than one) paths having the higher correlations with the received radio signal including the highest correlation with the received radio signal. Also, the receiving section generates the N path delay quantities for the searched paths, generates N demodulated signals from the baseband signal based on the N path delay quantities, and generates the object signal from the N demodulated signals. The memory circuit stores at least one SIR value as a previous SIR value. The estimating circuit estimates the SIR value from the object signal and stores the estimated SIR value in the memory circuit. The generating circuit generates a TPC (transmission power control) bit signal for controlling transmission power from the estimated SIR value and the previous SIR value stored in the memory circuit based on the N path delay quantities, N delay quantities for the N demodulated signals and a reference SIR value.

Here, the receiving section may include a detecting section, a synchronization tracking circuit, a demodulating section and a rake synthesizing circuit. The detecting section generates the baseband signal from the received radio signal. The synchronization tracking circuit searches the N paths having the higher correlations with the received radio signal including the highest correlation with the received radio signal, and generates the N path delay quantities for the searched paths. The demodulating section carries out despreading operations to the baseband signal based on the N path delay quantities to produce N despread signals and generates the N demodulated signals from the N despread signals and N delay quantities for the N demodulated signals. The rake synthesizing circuit generates the object signal from the N demodulated signals.

Also, the generating circuit generates the TPC bit signal using the estimated SIR value and the previous SIR value stored in the memory circuit, when all of the N path delay quantities and the N delay quantities are smaller than a threshold value, and using the previous SIR value stored in the memory circuit when any one of the N path delay quantities and the N delay quantities is larger than the threshold value.

Also, the generating circuit generates the TPC bit signal using an average of the estimated SIR value and the previous SIR value stored in the memory circuit when all of the N path delay quantities and the N delay quantities are smaller than the corresponding threshold values held in the generating circuit and using an average of the previous SIR value stored in the memory circuit when any one of the N path delay quantities and the N delay quantities is larger than the threshold value.

Also, it is desirable that a newer one of the estimated SIR value and the previous SIR value stored in the memory circuit is weighted with a larger weight.

Also, the generating circuit calculates a calculation SIR value from at least one of the estimated SIR value and the previous SIR value stored in the memory circuit. The generating circuit generates the TPC bit signal such that the transmission power is increased, when the calculation SIR value is equal to or smaller than the reference SIR value, and generates the TPC bit signal such that the transmission power is decreased, when the calculation SIR value is larger than the reference SIR value.

Also, the generating circuit may include a calculation control circuit, a calculating circuit, and a determining circuit. The calculation control circuit generates a calculation control signal based on the N path delay quantities, the delay quantities and the threshold value held therein. The calculating circuit calculates a calculation SIR value from the estimated SIR value and the previous SIR value stored in the memory circuit based on the control signal. The determining circuit generates the TPC bit signal based on the calculation SIR value and the reference SIR value.

DESCRIPTION OF THE PREFERRED EMBODIMENTS

Hereinafter, a CDMA receiving apparatus of the present invention will be described with reference to the attached drawings. The CDMA receiving apparatus 10 is provided for a base station and a mobile station.

Figure 1:
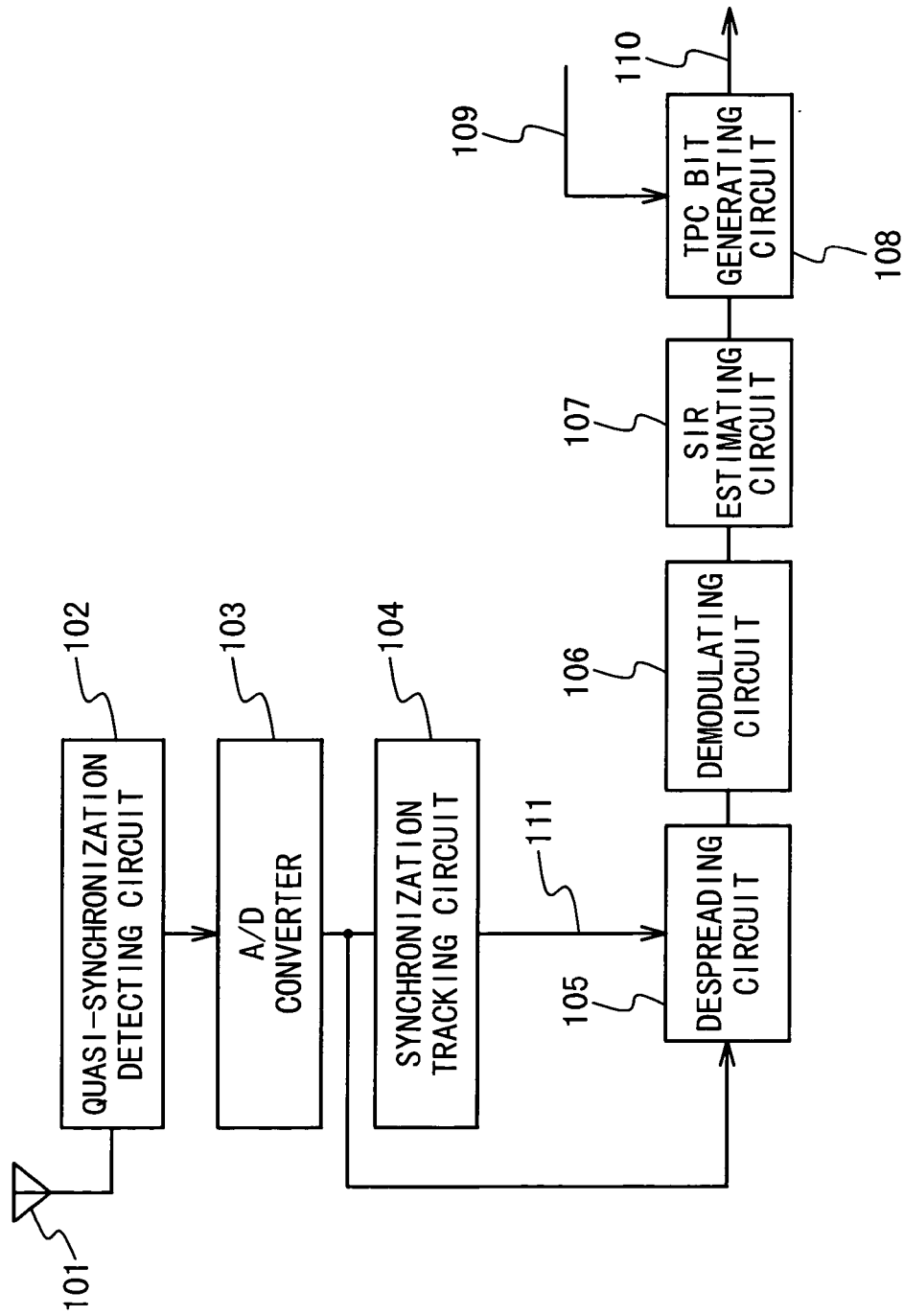
FIG. 1 is a block diagram showing an example of a conventional CDMA receiving apparatus.
Figure 2:
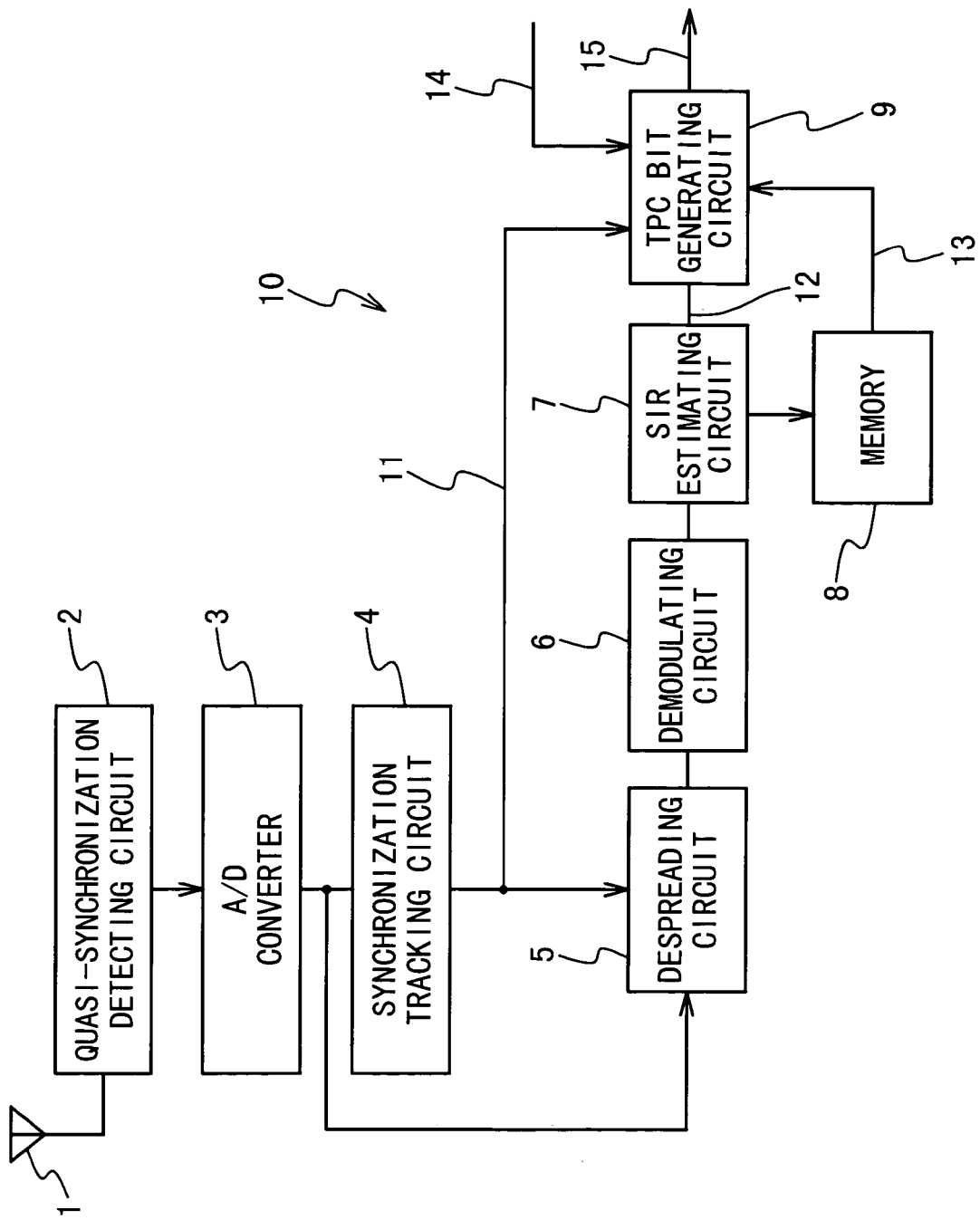
FIG. 2 is a block diagram showing a CDMA receiving apparatus according to a first embodiment of the present invention.

FIG. 2 shows the structure of the CDMA receiving apparatus 10 according to the first embodiment of the present invention. The CDMA receiving apparatus 10 in the first embodiment is composed of a receiving antenna 1, a quasi-synchronization detecting circuit 2, an A/D converter 3, a synchronization tracking circuit 4, a despreading circuit 5, a demodulating circuit 6, an SIR estimating circuit 7, a memory 8, and a TPC bit generating circuit 9.

The receiving antenna 1 is connected with the quasi-synchronization detecting circuit 2. The quasi-synchronization detecting circuit 2 is connected with the A/D converter 3. The A/D converter 3 is connected with the synchronization tracking circuit 4 and the despreading circuit 5. The synchronization tracking circuit 4 is connected with the despreading circuit 5 and the TPC bit generating circuit 9. The despreading circuit 5 is connected with the demodulating circuit 6. The demodulating circuit 6 is connected with the SIR estimating circuit 7. The SIR estimating circuit 7 is connected with a memory 8 and the TPC bit generating circuit 9. The memory 8 is connected with the TPC bit generating circuit 9.

The receiving antenna 1 receives a signal transmitted from a counter station and outputs the reception signal to the quasi-synchronization detecting circuit 2. The quasi-synchronization detecting circuit 2 converts the reception signal into a signal with a frequency band suitable for a baseband process, i.e., a baseband signal, and outputs to the A/D converter 3. The A/D converter 3 A/D-converts the baseband signal and outputs to the synchronization tracking circuit 4 and the despreading circuit 5. The synchronization tracking circuit 4 carries out path search to the reception signal using a spreading code signal for a specific user. A path delay quantity 11 of the path with the highest correlation value with the spreading code signal among the search paths is outputted to the despreading circuit 5 and the TPC bit generating circuit 9.

The despreading circuit 5 carries out a despreading process to the reception signal based on the path delay quantity 11. The demodulating circuit 6 adjusts and outputs a bit phase shift due to the fading in the reception signal and outputs a demodulated signal to the SIR estimating circuit 7.

The SIR estimating circuit 7 estimates an SIR value based on the demodulated signal and outputs the SIR value 12 to the memory 8 and the TPC bit generating circuit 9. The memory 8 stores the SIR value 12 and outputs the stored SIR value 13 to the TPC bit generating circuit 9. The stored SIR value may be singular or plural. When the SIR values more than a predetermined number are stored in the memory 8, the older SIR values are abandoned. The TPC bit generating circuit 9 calculates a SIR calculation value based on the path delay quantity 11, the SIR value 12 and the SIR value 13, compares the SIR calculation value and a reference SIR value 14 supplied from a host apparatus (not illustrated), and generates and outputs a TPC bit signal based on the comparison result. The TPC bit signal is used as a command for transmission power control.

Figure 3:
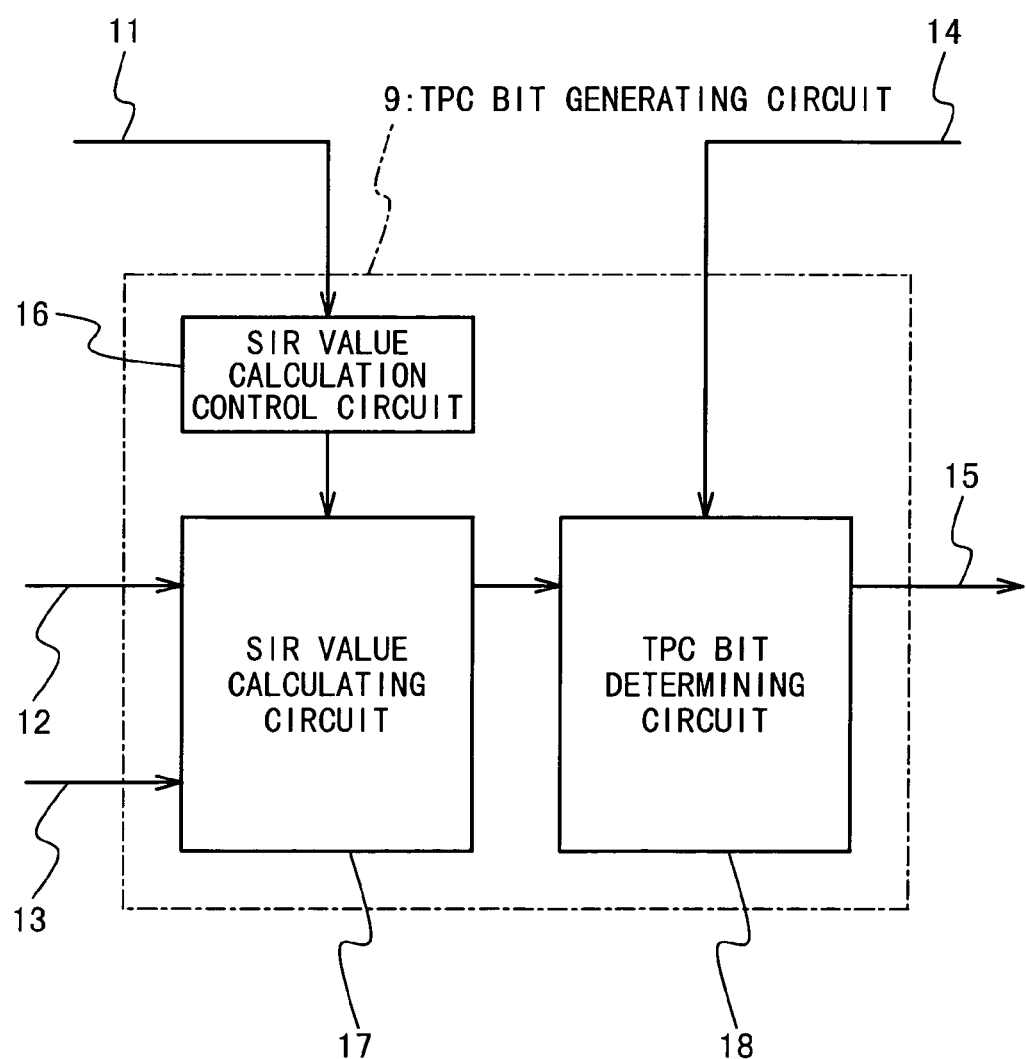
FIG. 3 is a block diagram showing a TPC bit generating circuit in the first embodiment.

FIG. 3 shows the TPC bit generating circuit 9 in detail. The TPC bit generating circuit 9 is composed of an SIR value calculation control circuit 16, an SIR value calculating circuit 17, and a TPC bit determining circuit 18. The synchronization tracking circuit 4 is connected with the SIR value calculation control circuit 16. The SIR estimating circuit 7, the memory 8 and the SIR value calculation control circuit 16 are connected with the SIR value calculating circuit 17. The SIR value calculating circuit 17 and the host apparatus are connected with the TPC Pit signal determining circuit 18.

The SIR value calculation control circuit 16 determines whether or not the current SIR value 12 outputted from the SIR estimating circuit 7 should be used for the generation of the TPC bit signal, based on the path delay quantity 11 outputted from the synchronization tracking circuit 4. The SIR value calculation control circuit 16 outputs a control signal to the SIR value calculating circuit 17 based on the determination result. That is, the SIR value calculation control circuit 16 originally has a threshold value to the path delay quantity. The SIR value calculation control circuit 16 instructs the SIR value calculating circuit 17 to use the SIR value 12 when the path delay quantity 11 is less than the threshold value, and instructs the SIR value calculating circuit 17 not to use the SIR value 12 when the path delay quantity 11 is equal to or larger than the threshold value.

The SIR value calculating circuit 17 averages the SIR value 12 and the SIR value 13 to find a SIR calculation value. Or, the SIR value calculating circuit 17 finds an SIR calculation value from only the SIR value 13. The SIR values 13 may be a singular SIR value or a plurality of SIR values. When the plurality of SIR values 13 are present, the SIR value calculating circuit 17 averages the SIR values 13 into the SIR calculation value. When the SIR value 13 Is singular, the SIR value calculating circuit 17 handles the SIR value 13 as the SIR calculation value just as it is. The SIR value calculating circuit 17 outputs the SIR calculation value to the TPC bit determining circuit 18.

The TPC bit signal determining circuit 18 compares the reference SIR value supplied from the host apparatus and the SIR calculation value supplied from the SIR calculating circuit 17 and generates a TPC bit signal 15 based on the comparison result. That is, the TPC bit signal 15 is a command for increasing transmission power, if (reference SIR value)≧(SIR calculation value), and is a command for decreasing the transmission power, if (reference SIR value) <(SIR calculation value).

The base station and the mobile station, each of which contains the CDMA receiving apparatus 10, transmit the TPC bit signals each other. The mobile station transmits a transmission signal to the base station. In the transmission signal, a pilot bit pattern is arranged periodically, i.e., for every slot. The pilot bit pattern is used to carry out quasi-synchronization detection of the transmission signal as a reference phase signal and is used to measure the SIR value. Moreover, in the transmission signal, the TPC bit signals are arranged periodically, i.e., for every slot.

In the base station, a pilot bit pattern is extracted from the transmission signal transmitted from the mobile station. Moreover, the transmission signal is divided for each of signals received via the plurality of different transmission routes or paths. One path with the highest correlation value with a spreading code signal for a specific user is selected from among the divided transmission signals and the path delay quantity for the selected path is measured. The despreading operation is carried out to the transmission signal for adjustment of a bit phase shift using the path delay quantity. The SIR value 12 is measured by use of the transmission signal for which the bit phase shift has been adjusted.

The current SIR value 12 measured by the SIR estimating circuit 7 is stored in the memory 8. The SIR value calculating circuit 17 inputs the current SIR value 12 from the SIR estimating circuit 7 and the previous SIR value 13 from the memory 8.

When the previously measured path delay quantity is smaller than a threshold value held in the SIR value calculation control circuit 16, the current SIR value 12 and the previous SIR value 13 are averaged and the SIR calculation value is generated. Also, when the path delay quantity is equal to or larger than the threshold value, the SIR calculation value is generated based on only the previous SIR value 13. The SIR calculation value is compared with the reference SIR value 14. The TPC bit signal is generated to control in such a manner that the transmission power of the transmission signal is decreased, when the SIR calculation value is equal to or larger than the reference SIR value 14. Also, the TPC bit signal is generated to control in such a manner that the transmission power of the transmission signal is increased, when the SIR calculation value is smaller than the reference SIR value 14.

Especially, when the path delay quantity is equal to or larger than the threshold value, the SIR calculation value is generated based on only the previous SIR value 13. The previous SIR value 13 may be singular or plural. When the SIR value 13 is singular, the SIR calculation value is the SIR value 13. When the SIR values are stored in the memory 8, the SIR calculation value is an average of the plurality of SIR values. The TPC bit signal is generated to control to decrease the transmission power of the transmission signal when the SIR calculation value is equal to or larger than the reference SIR value. The TPC bit signal is generated to control to increase the transmission power of the transmission signal when the SIR calculation value is smaller than the reference SIR value.

Such an average prevents generation of a wrong TPC bit signal when the SIR calculation value takes an extraordinary value because of erroneous detection and the subsequent process, and realizes the transmission power control in the higher precision. This average is desirable in that the newer SIR value is weighted in a heavier weight, because the current situation is reflected farther.

A generated TPC bit signal is arranged in the transmission slot and Is transmitted to the mobile station. The mobile station receives the transmission signal from the base station and extracts a TPC bit signal from the transmission signal. The transmission power is updated in accordance with the TPC bit signal. The transmission power control is carried out in the same way even if the base station and the mobile station are replaced.

When the path delay quantity is large, the timing when the pilot bit pattern is received is delayed so that the timing of the generation of the TPC bit signal is delayed in conjunction with the delay of the reception of the pilot bit pattern. Therefore, the TPC bit signal cannot be inserted in the transmission slot into which the TPC bit signal should be inserted. Like the present invention, when the TPC bit signal is generated from the previous SIR value stored in the memory 8, the TPC bit signal can be reliably inserted in the transmission slot.

Figure 4:
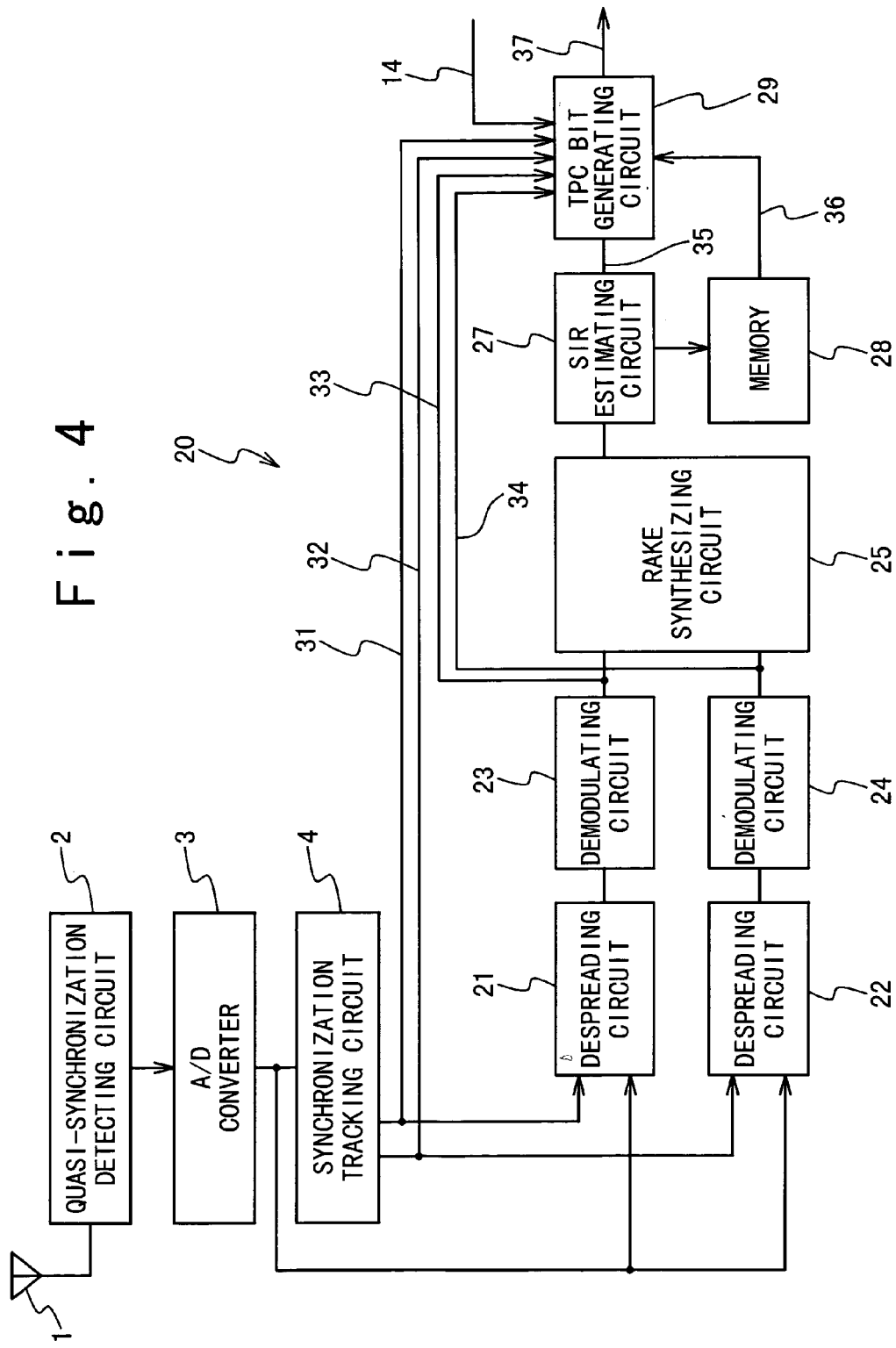
FIG. 4 is a block diagram showing the CDMA receiving apparatus according to a second embodiment of the present invention.

FIG. 4 shows the CDMA receiving apparatus according to the second embodiment of the present invention. As shown in FIG. 4, the CDMA receiving apparatus 20 is composed of a receiving antenna 1, a quasi-synchronization detecting circuit 2, an A/D converter 3, the synchronization tracking circuit 4, the despreading circuits 21 and 22, the demodulating circuits 23 and 24, a Rake synthesis circuit 25, an SIR estimating circuit 27, a memory 28 and a TPC bit generating circuit 29.

The receiving antenna 1 is connected with the quasi-synchronization detecting circuit 2. The quasi-synchronization detecting circuit 2 is connected with the A/D converter 3. The A/D converter 3 is connected with the synchronization tracking circuit 4 and the despreading circuits 21 and 22. The synchronization tracking circuit 4 is connected with the despreading circuit 21 and 22 and the TPC bit generating circuit 29. The despreading circuits 21 and 22 are connected with the demodulating circuits 23 and 24, respectively.

The demodulating circuit 23 is connected with the rake synthesis circuit 25 and the TPC bit generating circuit 29. The despreading Circuit 22 is connected with the demodulating circuit 24. The demodulating circuit 24 is connected with the rake synthesis circuit 25 and the TPC bit generating circuit 29. The rake synthesis circuit 25 is connected with the SIR estimating circuit 27. The SIR estimating circuit 27 is connected with the memory 28 and is connected with the TPC bit generating circuit 29. The memory 28 is connected with the TPC bit generating circuit 29.

The receiving antenna 1 outputs a reception signal to the quasi-synchronization detecting circuit 2. The quasi-synchronization detecting circuit 2 converts the reception signal into a signal with the frequency band for a baseband process, i.e., a baseband signal, and outputs to the A/D converter 3. The A/D converter 3 converts the analog signal into a digital signal and outputs to the synchronization tracking circuit 4 and the despreading circuits 21 and 22. The synchronization tracking circuit 4 carries out the path search to the baseband signal using a spreading code signal for a specific user. The synchronization tracking circuit 4 generates path delay quantities 31 and 32 for the paths with the two higher correlation values among the paths obtained through the path search using the spreading code signal and outputs the path delay quantities 31 and 32 to the TPC bit generating circuit 9 and the despreading circuits 21 and 22.

The despreading circuit 21 carries out the despreading operation to the baseband signal based on the path delay quantity 31. The demodulating circuit 23 adjusts a bit phase shift due to the fading to the reception signal and outputs the adjusted signal to the rake synthesis circuit 25. The despreading circuit 22 carries out the despreading operation to the baseband signal based on the path delay quantity 32. The demodulating circuit 24 adjusts a bit phase shift due to the fading to the reception signal and outputs to the rake synthesis circuit 25. The rake synthesis circuit 25 rake-synthesizes the demodulated signals outputted from the demodulating circuits 23 and 24 and outputs the rake-synthesized signal as an object signal to the SIR estimating circuit 27.

The SIR estimating circuit 27 estimates a current SIR value based on the object signal and outputs the estimated SIR value 35 to the memory 28 and the TPC bit generating circuit 29. The memory 28 stores the estimated SIR value as a previous SIR value and outputs the stored SIR value as the previous SIR value to the TPC bit generating circuit 29.

The TPC bit generating circuit 29 carries out an averaging operation with a weighting operation to the current SIR value 35 from the SIR estimating circuit 27 and the previous SIR value 36 from the memory 36 and generates a SIR calculation value. The TPC bit generating circuit 29 compares the SIR calculation value and a reference SIR value 141 supplied from the host apparatus (not illustrated), and generates a TPC bit signal based on the comparison result. The TPC bit signal is used as a command of the transmission power control.

Figure 5:
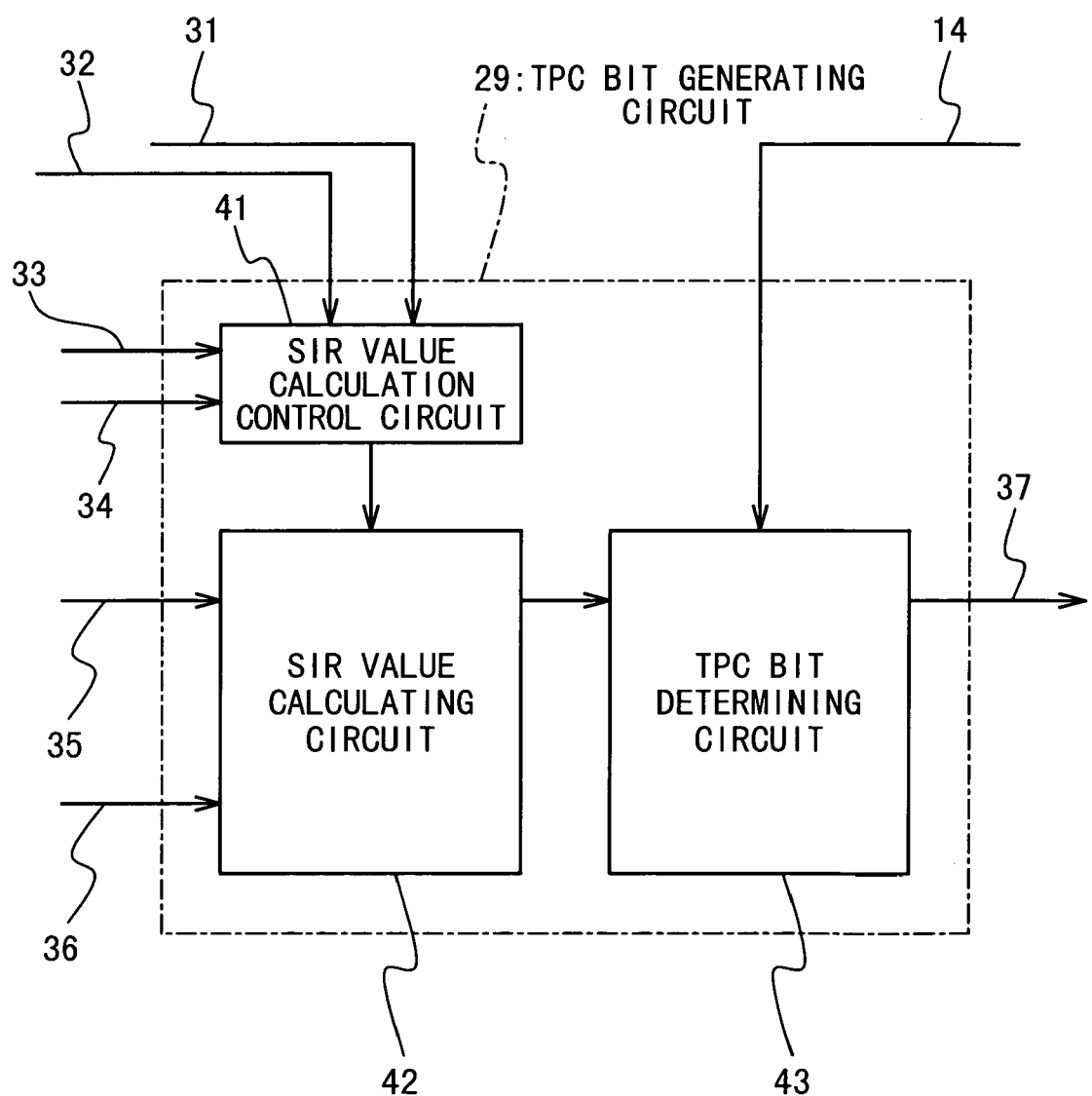
FIG. 5 is a block diagram showing a TPC bit generating circuit in the second embodiment.

FIG. 5 shows the TPC bit generating circuit 29 in detail. The TPC bit generating circuit 29 is composed of an SIR value calculation control circuit 41, an SIR value calculating circuit 42, and a TPC bit signal determining circuit 43. The synchronization tracking circuit 4 is connected with the SIR value calculation control circuit 41. The demodulating circuits 23 and 24 are connected with the SIR value calculation control circuit 41. The SIR estimating circuit 27, the memory 28 and the SIR value calculation control circuit 41 are connected with the SIR value calculating circuit 42. The SIR value calculating circuit 42 and the host apparatus are connected with the TPC bit signal determining circuit 43.

The SIR value calculation control circuit 41 always monitors the largest one of delay quantities from the two demodulating circuits 23 and 24 and the path delay quantities from the synchronization tracking circuit 4, and operates using the largest path delay quantity. That is, the SIR value calculation control circuit 41 determines whether or not the latest SIR value should be used for the calculation, based on the largest one of the path delay quantities and outputs a control signal to the SIR value calculating circuit 42. That is, the SIR value calculation control circuit 41 has a threshold value for the largest one of the path delay quantities and instructs the SIR value calculating circuit 17 to use only the previous SIR values when the largest path delay quantity is larger than the threshold value.

The SIR value calculating circuit 42 carries out an averaging operation with a weighting operation to the current SIR value supplied from the SIR estimating circuit 27 and the previous SIR value supplied from the memory 8 and outputs an averaged SIR value to the TPC bit signal determining circuit 43. The TPC bit signal determining circuit 43 compares the reference SIR value 14 supplied from the host apparatus and the averaged SIR calculation value and generates a TPC bit signal 37 based on the comparison result. That Is, the TPC bit signal determining circuit 43 generates the TPC bit signal 37 to increase transmission power, if (reference SIR value)≧(SIR calculation value), and generates the TPC bit signal 37 to decrease transmission power, if (reference SIR value)<(SIR calculation value).

The base station and the mobile station which contain CDMA receiving apparatuses 20 are transmitting the TPC bit signal each other. In the base station, a quasi-synchronization detection is carried out to the transmission signal using the pilot bit pattern so that the received signal is divided into signals, each of which is received via one of a plurality of different transmission routes (paths). The two paths having higher correlation values with the spreading signal for a specific user are selected, and the path delay quantities for the selected paths are measured. The transmission signal Is subjected to the despreading operation using the path delay quantities and is subjected to the adjustment of bit phase shifts depending on the paths. The signals subjected to the adjustment of the bit phase shifts are rake-synthesized. The SIR value 35 is estimated based on the rake-synthesized reception signal.

The SIR value 35 estimated by the SIR estimating circuit 27 is stored in the memory 8. The current SIR value 35 from the SIR estimating circuit 27 and the previous SIR value 36 from the memory 8 are supplied to the SIR value calculating circuit 42 When all the path delay quantities are smaller than the threshold value, the current SIR value 35 and the previous SIR value 36 are averaged and the SIR calculation value is generated. The SIR calculation value is compared with the reference SIR value 14. When the SIR calculation value is larger than the reference SIR value 14, the TPC bit signal is generated to control to decrease the transmission power of the transmission signal. When the SIR calculation value is smaller than the reference SIR value 14, the TPC bit signal is generated to control to increase the transmission power of the transmission signal.

When at least one of the path delay quantities is larger than the threshold value, the SIR calculation value is generated based on only the previous SIR value 36. When the SIR value is larger than the reference SIR value, the TPC bit signal is generated to control to decrease the transmission power of the transmission signal. When the SIR value is smaller than the reference SIR value, the TPC bit signal is generated to control to Increase the transmission power of the transmission signal.

The range to be path searched is longer than the range in case of the reception not subjected to rake-synthesis to acquire the necessary path delay quantity to achieve rake reception in rake synthesis. Therefore, when the path delay quantity is large, there is a possibility for the time of the generation of the TPC bit signal to be delayed from the reception when the rake synthesis is not carried out. The CDMA receiving apparatus of the present invention can insert the TPC bit signal in the transmission slot reliably even when the rake synthesis is carried out.

In the CDMA receiving apparatus according to a modification of the present invention, the TPC bit signal may indicate three kinds of commands, that is, the transmission power is decreased, not changed and increased. In this case, the TPC bit signal is generated to control such that the transmission power is not changed when the path delay quantity or the largest path delay quantity is larger than the threshold value held in the SIR value calculation control circuit 16 or 41. In this case, no change of the transmission power may be directly informed to the TPC bit determining circuit 18 or 43, although such an information line is not shown. The other operation is same as the first embodiment. Such a TPC bit signal is reliably inserted in the transmission slot. Because the fading is slowly changed generally, there is no trouble when the transmission power is not changed. Moreover, if the previous SIR value is not used, the memory may be omitted from the structure of the above embodiments. The structure is simple.

The CDMA receiving apparatus of the present invention can insert a TPC bit signal In the transmission signal reliably. As a result, the transmission power control can be carried out in high precise at high speed.

What is claimed is:

1. A CDMA (code division multiple access) receiving apparatus comprising:
    a receiving section configured to generate a baseband signal from a received radio signal, search a path having a highest correlation with the received radio signal, generate a path delay quantity for the searched path, and generate a demodulated signal as an object signal from the baseband signal based on said path delay quantity;
    a memory circuit configured to store at least one SIR (signal-to-interference plus noise power ratio) value as a previous SIR value;
    an estimating circuit configured to estimate a SIR value from said object signal and store said estimated SIR value in said memory circuit; and
    a generating circuit configured to generate a TPC (transmission power control) bit signal for controlling transmission power from the estimated SIR value and at least one previous SIR value stored in said memory circuit based on said path delay quantity and a reference SIR value.

2. The CDMA receiving apparatus according to claim 1, wherein said generating circuit is configured to generate said TPC bit signal using said estimated SIR value and said at least one previous SIR value stored in said memory circuit when said path delay quantity is equal to or smaller than a threshold value held in said generating circuit, and using said at least one previous SIR value stored in said memory circuit when said path delay quantity is larger than said threshold value.

3. The CDMA receiving apparatus according to claim 2, wherein said generating circuit is configured to generate said TPC bit signal using an average of said estimated SIR value and said at least one previous SIR value stored in said memory circuit when said path delay quantity is equal to or smaller than said threshold value held in said generating circuit, and using an average of said at least one previous SIR value held in said memory circuit when said path delay quantity is larger than said first threshold value.

4. The CDMA receiving apparatus according to claim 3, wherein a newer one of said estimated SIR value and said at least one previous SIR value stored in said memory circuit is weighted with a larger weight.

5. The CDMA receiving apparatus according to claim 1, wherein said generating circuit is configured to calculate a calculation SIR value from at least one of said estimated SIR value and said at least one previous SIR value stored in said memory circuit, and generate said TPC bit signal such that the transmission power is increased when said calculation SIR value is equal to or smaller than said reference SIR value, and generate said TPC bit signal such that the transmission power is decreased when said calculation SIR value is larger than said reference SIR value.

6. The CDMA receiving apparatus according to claim 1, wherein said generating circuit comprises:
    a calculation control circuit configured to generate a calculation control signal based on said path delay quantity and a first threshold value held therein;
    a calculating circuit configured to calculate a calculation SIR value from said estimated SIR value and said at least one previous SIR value stored in said memory circuit based on said control signal; and
    a determining circuit configured to generate said TPC bit signal based on said calculation SIR value and said reference SIR value.

7. The CDMA receiving apparatus according to claim 1, wherein said receiving section comprises:
- a detecting section configured to generate a baseband signal;
- a synchronization tracking circuit configured to search said path having the highest correlation with the received radio signal, and generate said path delay quantity for the searched path; and
- a demodulating section configured to carry out a despreading operation on said baseband signal based on said path delay quantity to produce a despread signal, and generate the demodulated signal as said object signal from the despread signal.

8. A CDMA (code division multiple access) receiving apparatus comprising:
- a receiving section configured to generate a baseband signal from a received radio signal, search N paths having a highest correlation with the received radio signal, said searched paths including a path with a highest correlation with the received radio signal generate N path delay quantities for the searched paths, generate N demodulated signals from the baseband signal based on said N path delay quantities, and generate an object signal from said N demodulated signals;
- a memory circuit configured to store at least one SIR (signal-to-interference plus noise power ratio) value as a previous SIR value;
- an estimating circuit configured to estimate a SIR value from said object signal and store said estimated SIR value in said memory circuit; and p1 a generating circuit configured to generate a TPC (transmission power control) bit signal for controlling transmission power from the estimated SIR value and at least one previous SIR value stored in said memory circuit based on said N path delay quantities, N demodulation delay quantities for said N demodulated signals, and a reference SIR value,
where N is an integer greater than one.

9. The CDMA receiving apparatus according to claim 8, wherein said receiving section comprises:
- a detecting section configured to generate said baseband signal;
- a synchronization tracking circuit configured to search said N paths having the higher correlations with the received radio signal including the highest correlation with the received radio signal, and generate said N path delay quantities for the searched paths;
- a demodulating section configured to carry out despreading operations on said baseband signal based on said N path delay quantities, to produce N despread signals, and generate said N demodulated signals from the N despread signals and said N demodulation delay quantities for said N demodulated signals; and
- a rake synthesizing circuit configured to generate said object signal from said N demodulated signals.

10. The CDMA receiving apparatus according to claim 8, wherein said generating circuit is configured to generate said TPC bit signal using said estimated SIR value and said at least one previous SIR value stored in said memory circuit when all of said N path delay quantities and said N demodulation delay quantities are smaller than a threshold value, and using said at least one previous SIR value stored in said memory circuit when any one of said N path delay quantities and said N demodulation delay quantities is larger than the threshold value.

11. The CDMA receiving apparatus according to claim 10, wherein said generating circuit is configured to generate said TPC bit signal using an average of said estimated SIR value and said at least one previous SIR value stored in said memory circuit when all of said N path delay quantities and said N demodulation delay quantities are smaller than the threshold value held in said generating circuit, and using an average of said at least one previous SIR value stored in said memory circuit when any one of said N path delay quantities and said N demodulation delay quantities is larger than said threshold value.

12. The CDMA receiving apparatus according to claim 11, wherein a newer one of said estimated SIR value and said at least one previous SIR value stored in said memory circuit is weighted with a larger weight.

13. The CDMA receiving apparatus according to claim 8, wherein said generating circuit is configured to calculate a calculation SIR value from at least one of said estimated SIR value and said at least one previous SIR value stored in said memory circuit, and generate said TPC bit signal such that the transmission power is increased when said calculation SIR value is equal to or smaller than said reference SIR value, and generate said TPC bit signal such that the transmission power is decreased when said calculation SIR value is larger than said reference SIR value.

14. The CDMA receiving apparatus according to claim 8, wherein said generating circuit comprises:
- a calculation control circuit configured to generate a calculation control signal based on said N path delay quantities, said N demodulation delay quantities and a threshold value;
- a calculating circuit configured to calculate a calculation SIR value from said estimated SIR value and said at least one previous SIR value stored in said memory circuit based on a control signal; and
- a determining circuit configured to generate said TPC bit signal based on said calculation SIR value and a reference SIR value.

15. The CDMA receiving apparatus according to claim 1, wherein said estimating circuit is configured to estimate a SIR value in response to said receiving section searching the path.

* * * * *